W. BERGER.
FENDER FOR AGRICULTURAL IMPLEMENTS.
APPLICATION FILED APR. 27, 1914.
1,150,847.
Patented Aug. 24, 1915.
2 SHEETS—SHEET 1.
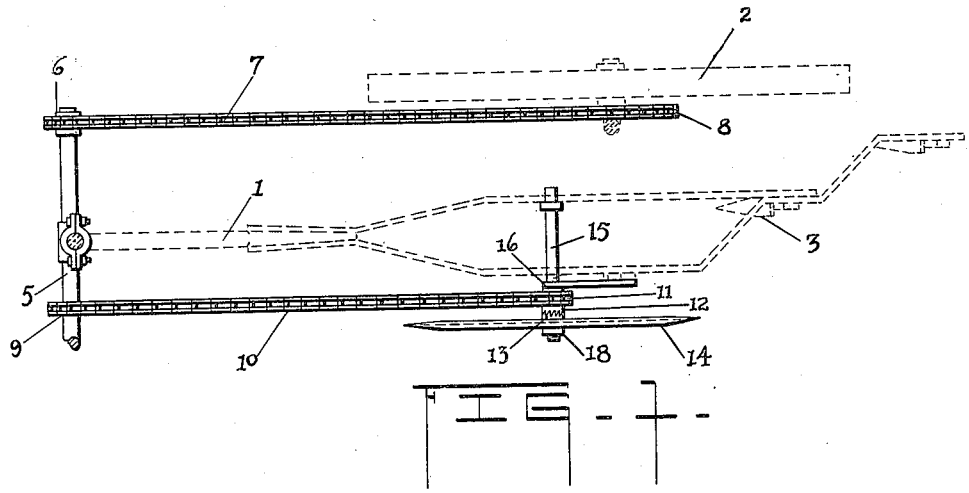
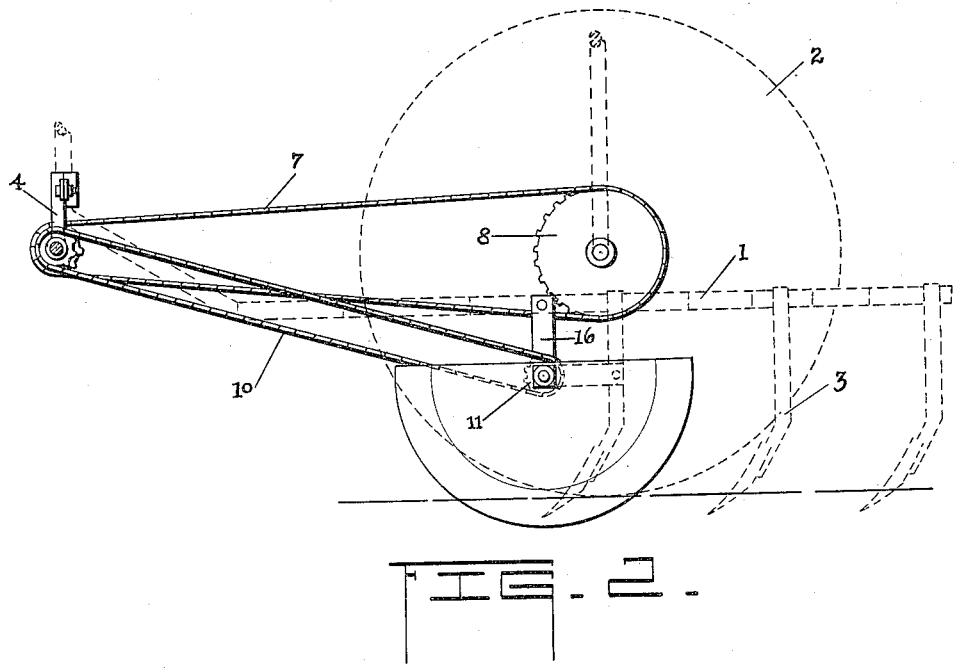
WITNESSES.
INVENTOR.
William Berger
By LaPate & Bean
Atty's W. BERGER.
FENDER FOR AGRICULTURAL IMPLEMENTS.
APPLICATION FILED APR. 27, 1914.
1,150,847.
Patented Aug. 24, 1915.
2 SHEETS—SHEET 2.
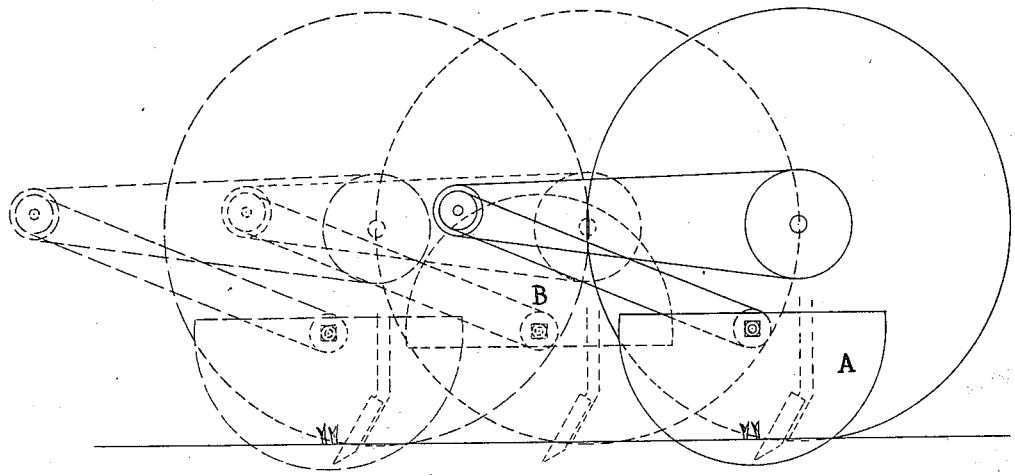
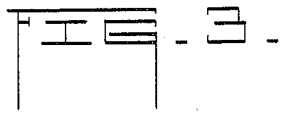
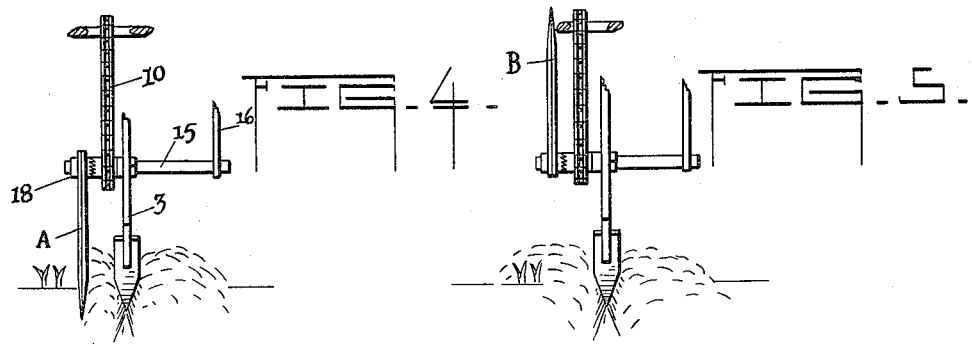
WITNESSES.
INVENTOR.
William Berger
By
Attys.

UNITED STATES PATENT OFFICE.

WILLIAM BERGER, OF MORTON, ILLINOIS.

FENDER FOR AGRICULTURAL IMPLEMENTS.

1,150,847.   Specification of Letters Patent.   Patented Aug. 24, 1915.

Application filed April 27, 1914. Serial No. 834,623.

*To all whom it may concern:*

Be it known that I, WILLIAM BERGER, a citizen of the United States, a resident of Morton, in the county of Tazewell and State of Illinois, have invented new and useful Improvements in Fenders for Agricultural Implements, of which the following is a specification.

My invention relates to improvements in agricultural implements and particularly to the provision of a fender therefor.

The principal object of my invention is the provision of a rotary fender construction for a cultivator which is adapted to straddle the rows of the growing crop, the fender rotating so as to protect the growing plants and to permit the earth or soil to be thrown upon the weeds between the hills of the growing plants.

A further object is the provision of a fender for a corn cultivator, mechanism for operating the fender from the wheel of the cultivator whereby the fender is moved into position to protect the hills of corn and is raised between the hills of corn so as to permit the earth or soil to be thrown upon the weeds, between the separate hills of corn.

To the accomplishment of the foregoing and such other objects as may hereinafter appear, my invention consists in the combination, construction and arrangement of parts hereinafter described, and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims, without digressing from my inventive idea.

In the drawings:—Figure 1 represents in plan, a view of part of a cultivator with a device constructed according to my invention arranged thereon; Fig. 2 is a side elevation of the same; Fig. 3 is a diagrammatic side elevation illustrating the different positions assumed by the fender, and Fig. 4 is a rear elevation of one of the cultivator blades and the fender in its guarding position; Fig. 5 is a similar view with the fender in its raised position.

In cultivating corn and other crops, after they have been sprouted, that is crops which are planted in rows and hills, it is desirable to protect the sprouted plants from being damaged by earth or soil being thrown thereupon, or to prevent them being pulled out, due to the adjacent earth or sod sticking to the cultivator blades, and it is also desirable that the earth or soil be thrown upon the weeds or other plant life between the individual hills forming the row of the growing crop. It is for the purpose of providing a construction of fender for the cultivator which will operate to obtain these various results, the fender being so constructed and operated as to be positioned opposite each hill of the crop to prevent the soil being thrown thereupon, and also serving as a cutter to cut the sod or solid earth whereby the hill of the crop is prevented from being pulled out by the cultivator blade. Between the individual hills forming the row, the fender is raised so as to permit the earth and soil to be thrown upon the weeds and other plant life between the individual hills of the row.

Referring now to the drawing, the numeral 1 indicates the frame of a standard form of cultivator supported by means of the wheels 2 and having the cultivator blades 3 arranged, as is well understood by any one versed in the art. It is to be understood that I have shown one form of cultivator merely for the purpose of illustrative disclosure and that my invention is adapted for attachment and adaptation to various standard forms of cultivators and other agricultural implements.

Mounted to rotate in the bracket members 4 which depend from a forward part of the frame, is the shaft 5 having the sprocket wheel 6 thereon at one end, driven by means of chain 7, over the sprocket wheel 8 which is connected to rotate with the wheel 2, as shown. On this shaft 5 is the driving sprocket wheel 9 which drives chain 10, which chain drives the sprocket wheel 11 mounted on the clutch member or sleeve 12, as shown, this member 12 having a ratchet face to correspond with the face of the hub member 13 of the fender 14, these parts 11, 12, 13 and 14 all being rotatably mounted on the short shaft 15 which is supported by suitable brackets 16 from the frame 1 of the cultivator. Attention is called to the fact that the fender is formed of a substantially semi-circular shape, having the sharpened edge 17 and being held on the shaft 15 by means of the nut connection 18. This connection provides means whereby the fender may be disconnected or may be adjusted relative to the rotation of the wheel 2, so that it may be properly timed in operation.

It is to be understood that the parts are duplicated on the opposite side in the straddle row cultivator such as illustrated, and that this illustration and description is omitted as it would entail needless repetition.

It is to be seen that as shown in Figs. 3, 4 and 5 particularly, that the fender is placed at position A opposite the hill of the crop and at position B between the individual hills, whereby, the results desired and previously mentioned at length hereinbefore, are accomplished. Further, it is to be seen that the fender is so constructed that it will operate to cut the soil or sod adjacent the hill of the crop, whereby it is prevented from being uprooted.

What I claim is:—

1. In combination with an agricultural implement provided with a ground engaging element, of a shaft, means for rotating said shaft, a fender attached to said shaft, the upper edge of said fender terminating substantially on a line with said shaft, whereby when said shaft is rotated the fender is intermittently brought into position to arrest the material thrown by said ground engaging element.

2. In combination with an agricultural implement provided with a ground engaging element, of a shaft, means for rotating said shaft, a fender attached to said shaft and extending vertically from one side thereof, whereby when the shaft is rotated the fender is intermittently brought into position to arrest the material thrown by said ground engaging element.

WILLIAM BERGER.

In the presence of—
FRED W. REULING,
G. E. WILD.

Copies of this patent may be obtained for five cents each, by addressing the "Commissioner of Patents, Washington, D. C."